US005507640A

United States Patent [19]
Gilmer et al.

[11] Patent Number: 5,507,640
[45] Date of Patent: Apr. 16, 1996

[54] APPARATUS AND METHOD USEFUL IN MANUFACTURE OF TWO PIECE CUPS

[75] Inventors: Robin A. Gilmer, Marietta; Charles B. Green, Smyrna, both of Ga.

[73] Assignee: Amoco Corporation, Chicago, Ill.

[21] Appl. No.: 989,225

[22] Filed: Dec. 11, 1992

[51] Int. Cl.⁶ .................................................. F24J 3/00
[52] U.S. Cl. ........................ 432/225; 432/230; 34/104; 34/105; 34/218; 34/219
[58] Field of Search .................................. 432/225, 230; 34/104, 105, 218, 219

[56] References Cited

U.S. PATENT DOCUMENTS 3,825,408  7/1974  Farfaglia et al. .................... 34/104

Primary Examiner—Henry A. Bennett
Assistant Examiner—Sid Ohri
Attorney, Agent, or Firm—Nicholas A. Poulos; Scott P. McDonald; Stephen L. Hensley

[57] ABSTRACT

An improved heating method and heating nozzle useful in the forming of a two-piece thermoplastic foam cup assembled from two thermoplastic foam pieces on a cup-forming turret machine. The method and apparatus of the invention prevent premature sticking of the foam bottom piece to the foam sidewall piece and result in better sealing of the foam bottom to the sidewall.

9 Claims, 5 Drawing Sheets

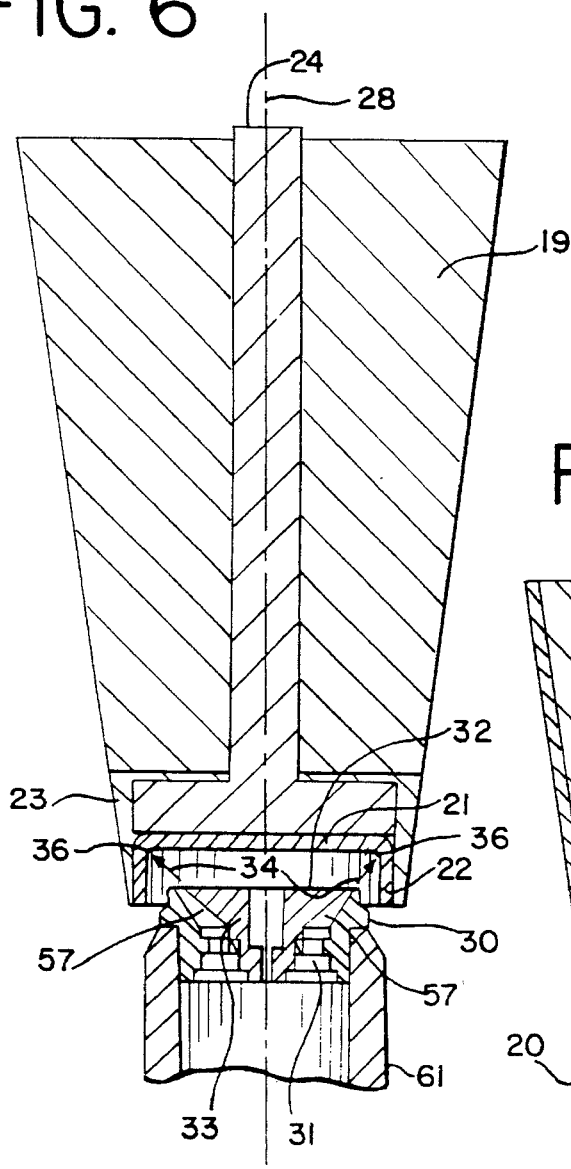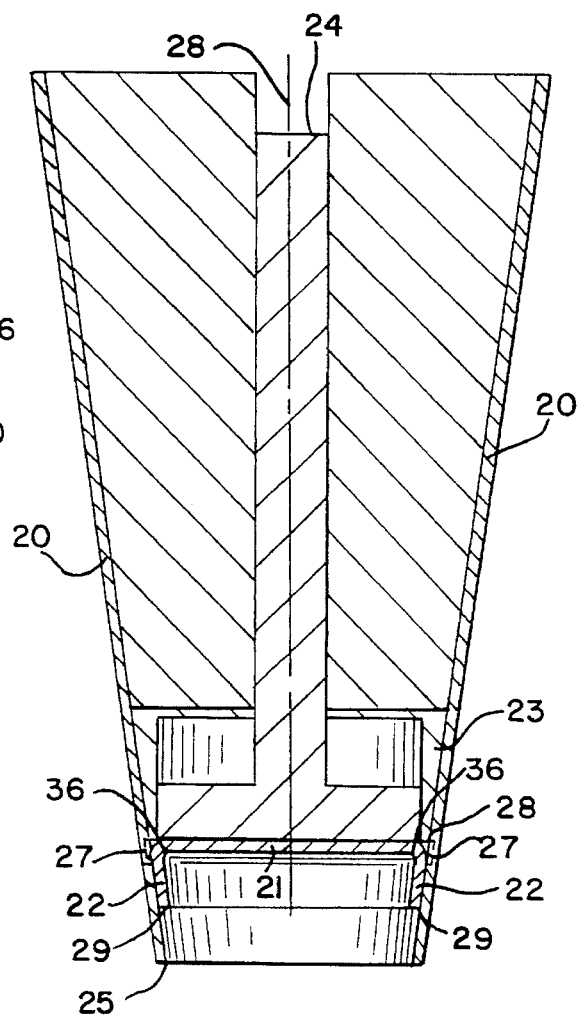

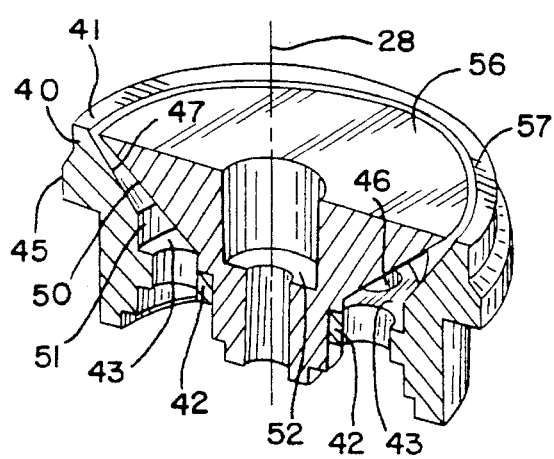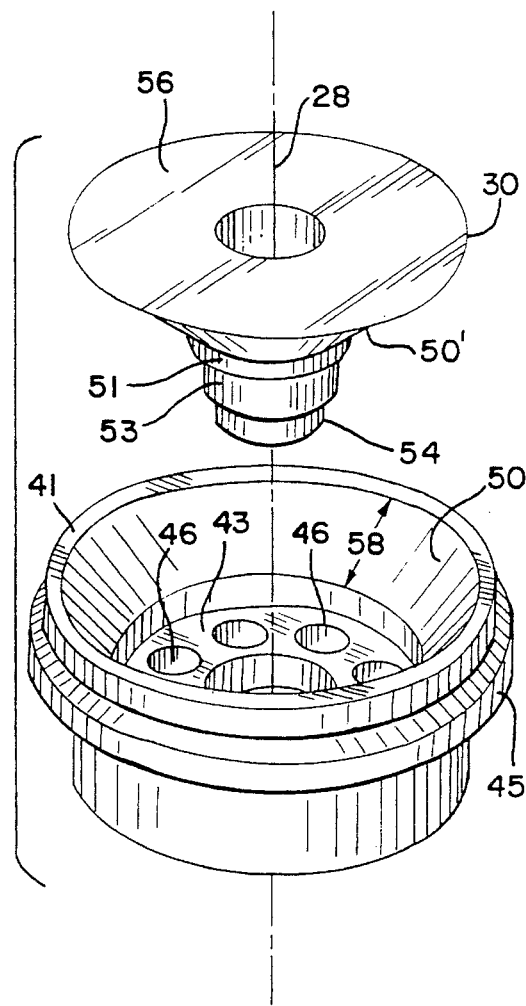

1

APPARATUS AND METHOD USEFUL IN MANUFACTURE OF TWO PIECE CUPS

FIELD OF THE INVENTION

This invention relates generally to an apparatus and method useful in the manufacture of two piece cups and containers, and more specifically, to an apparatus and method useful in the manufacture of a two piece, thermoplastic foam cup or container having an improved bottom wall seal.

BACKGROUND OF THE INVENTION

Thermoplastic foam cups are widely used for serving hot and cold beverages, and large numbers of them are used daily. They generally are made from polystyrene and are readily recycled. One type of foam cup, the APPLAUSE® cup, available from Amoco Foam Products Company, has an excellent combination of insulative and aesthetic properties. The APPLAUSE® cup is a two piece cup which comprises a circumferential sidewall, an integral rolled rim at the top of the sidewall and a recessed bottom wall which is sealed to the sidewall at a point above the bottom surface of the sidewall. The APPLAUSE® cup is produced from two foam substrate pieces, called "blanks", on a 1000 F machine manufactured by Paper Machinery Corporation ("PMC") of Milwaukee, Wis. This company is widely known as a major producer of machines for manufacture of paper cups. The PMC machines are proven machines which can sustain acceptable rates of cup production for long periods.

The operation of a PMC machine to produce a paper cup from paper blanks is described in detail in U.S. Pat. No. 4,490,130, Konzal et al., issued Dec. 25, 1984. The machine on which the blanks are assembled and formed into a cup comprises a turret with a vertical axis. On the turret are a number of mandrels that project radially from the axis and are carried to each of a succession of work stations by indexing rotation of the turret. To make tapered cups, the mandrels are frustoconical in shape with each mandrel tapering in the direction away from the turret axis and having at its small diameter outer end a mandrel nose in which there are suction inlet openings. The mandrel nose is shaped to accept and hold a circular, bottom wall blank having a circumferential flange, so that the flange will not be in contact with a surrounding sidewall blank wrapped around the mandrel. In the operation of the machine, the flanged bottom wall blank is concentrically attached by suction to the mandrel nose, with its flange projecting away from the outer end of the mandrel. Thereafter, the sidewall blank is wrapped around the mandrel and the bottom wall blank. The marginal side edge portions of the sidewall blank are then overlapped and bonded to one another to form a side seam of the cup. Subsequently, it is also necessary to seal the flange of the bottom wall blank to the sidewall blank to form a bottom seam. This bottom wall sealing is performed in several processing steps, including a single heating stage using a heating gas nozzle, which are carried out at different work stations. The heating stage uses a radial flow heating nozzle, for directing a stream of heating gas, which is placed near the bottom blank for heating the sidewall. After heating the bottom blank is moved inside the sidewall blank into its final sealing position. After completion of the heating stage, the mandrel and heated cup are indexed to other work stations where the lower end of the sidewall is wrapped around and pressed against the flange portion of the bottom blank to complete the bottom sealing. Other operations may then be performed upon the top and bottom edges of the cup sidewall, such as forming the cup rim and treating the cup to increase its strength by expanding the sidewall thickness.

The manufacture of thermoplastic foam cups on the PMC machine is essentially the same operation as the paper two piece cup manufacture described in Konzal et al., with a change to a foam substrate and use of an additional second heating stage in the bottom wall sealing operation. Modifications of Konzal et al.'s process for foam cup production have been disclosed. U.S. Pat. No. 4,579,275, Peelman et al., issued Apr. 1, 1986, and incorporated herein by reference, discloses a foam sidewall blank treating process to increase the sidewall strength. A process for sidewall expansion treatment of foam two-piece cups is disclosed in U.S. Pat. No. 4,878,970, Schubert et al., issued Nov. 7, 1989, and incorporated herein by reference. However, the formation of a well bonded, leak-proof bottom seam in a two piece cup, whether foam or paper, is vital.

Bottom wall sealing problems in manufacture of foam two-piece cups on the PMC machine have occurred. Foam two-piece cup manufacture uses an additional heating stage in the bottom sealing operation; a first and a second heating stage are performed. The bottom wall sealing problems are connected to the first heating stage of the bottom wall sealing process. The first heating stage of foam cup manufacture is performed after the circular, bottom wall foam blank is installed on the mandrel nose, but before the sidewall blank is wrapped around the mandrel. After installation on the mandrel nose, the bottom blank is heated by bringing the radial flow heating nozzle described in Konzal et al. into proximity to it. After this first heating stage, the bottom wall blank on its mandrel is indexed to another work station where the sidewall blank is wrapped around the mandrel and the side seam formed, as in Konzal et al. Thereafter, the mandrel with the sidewall blank and bottom wall blank installed is indexed to another work station where the second heating stage is performed. This second heating stage in foam cup production employs the radial flow heating nozzle of Konzal et al. and is performed primarily to heat the sidewall blank. After this stage, the bottom wall blank is moved inside the surrounding sidewall blank to its sealing position along the sidewall, and sealing of the bottom wall blank to the sidewall blank is completed with the additional steps.

Applicants have found, however, that the radial flow heating nozzle described in Konzal et al., although suitable for paper cup manufacture, creates a problem which can lead to improper sealing of the foam bottom wall blank to the foam sidewall blank, resulting in an unacceptable number of leaking cups. In the first heating stage of foam cup production, the radial heating nozzle directs a stream of heating gas radially outward from the side of the heating nozzle; i.e. the gas flow direction is perpendicular to the central axis of the heating nozzle. Because the bottom wall blank is installed on the mandrel nose perpendicular to the central axis of the nozzle, the angle of incidence of the heating gas stream to the bottom wall blank is essentially zero degrees. See FIGS. 17 and 20 of Konzal et al., showing gas outlet holes 53 on the side of the nozzle (FIG. 17) and the nozzle in heating position adjacent the bottom wall blank and the heating gas flow direction (FIG. 20). In other words, the stream is aimed below the circumferential portion of the bottom wall blank which conforms to the sidewall blank. With the existing nozzle, the heating gas stream is not aimed near the fold point between the circumferential portion of the bottom wall blank and the rest of the bottom wall blank.

Further, the purpose of the prior art heating stage in paper cup production is to melt a thin thermoplastic coating on the paper blanks, which when cooled and solidified, forms the bottom wall seal between the bottom wall blank and the sidewall blanks. In paper cup production, heating to enhance shape retention of the bottom wall blank is not important, because the paper blank does not stick when being moved inside the sidewall blank. Applicants have found that a foam bottom wall blank, however, can stick to a foam sidewall blank, and heating the bottom blank to enhance its shape retention and thereby avoid sticking is highly desirable. The purpose of the first heating stage in foam cup production is therefore to "set" the bottom blank into shape. The radial flow heating nozzle directs insufficient heating gas at the bottom blank to enhance its shape retention.

Simply put, although the existing PMC nozzle can be used in producing foam cups, it was designed for paper cup production. As explained below, the prior art nozzle can produce sticking between a foam bottom wall blank and a foam sidewall blank which occurs when the bottom wall blank is moved to its sealing position, potentially leading to a bad seal.

It is the general object of this invention to provide an improved apparatus and method useful in the manufacture of two piece cups, particularly thermoplastic foam two piece cups. It is another object to provide a recessed bottom wall foam cup having an improved bottom wall seal. It is a more specific object to provide a new heating nozzle and method for the manufacture of recessed bottom wall foam cups which overcome the problem created by the prior art nozzle design. Other objects appear below. We have found the objects of the invention can be attained by the apparatus and method described below.

SUMMARY OF THE INVENTION

The invention broadly comprises a heating method and heating nozzle apparatus useful in manufacture of a two piece cup from two substrate blanks. The heating nozzle apparatus and method of the invention are preferably used in the manufacture of a thermoplastic foam cup produced from two thermoplastic foam blanks. According to the invention, in the manufacture of such a foam cup, a circular, foam bottom wall blank having a circumferential flange portion is inserted into a circumferential foam sidewall blank, heated with the apparatus or according to the method of the invention and subsequently moved inside a surrounding sidewall blank to its final sealing position. The inventive method and nozzle operate by directing a stream of heating gas at a junction between the circular, bottom wall blank and the flange portion on the circumference of the bottom wall blank. The heating nozzle and method of the invention have the important advantage of enhancing the shape retention of the foam bottom wall blank, thereby avoiding premature sticking of the flange portion of the bottom wall blank to the sidewall blank when the bottom wall blank is moved to its sealing position.

The invention thus comprises an apparatus useful in making a recessed bottom, two-piece cup having a circumferential sidewall formed from a sidewall blank and having a recessed bottom wall formed from a bottom wall blank, which comprises a heating nozzle having a central axis and comprising a top face, a side face and at least one heating gas flow channel having a gas exit, wherein the heating gas flow channel has an angle of incidence to a plane oriented perpendicular to the central axis of the nozzle in the range of about 30 degrees to about 90 degrees, preferably about 30 to about 60 degrees.

The invention also comprises a method useful in the forming from a bottom wall blank and a sidewall blank of a two-piece cup having (i) a circumferential sidewall comprising a sidewall bottom surface, and (ii) a recessed bottom wall which is recessed to a final bottom wall position point above the sidewall bottom surface, comprising: heating a substantially circular bottom wall blank having a circumferential flange portion for a time sufficient to enhance shape retention of the bottom wall blank, wherein the heating is performed by directing a stream of heating gas primarily at the junction point of the flange portion of the bottom wall blank and the remainder of the bottom wall blank. Preferably, the heating gas stream is directed with an angle of incidence to the plane of the bottom wall blank in the range of about 30 degrees to about 90 degrees, and more preferably about 30 to about 60 degrees.

The invention has the important advantage of permitting production of two-piece cups, particularly two-piece foam cups, having improved bottom seals. The cups produced on the PMC machine using the method and apparatus of the invention have significantly reduced reject rates due to improper sealing of the bottom wall to the sidewall. The method and apparatus of the invention reduced sticking of the flanged portion of the bottom blank to the sidewall blank when moving the bottom wall blank to its final location. The invention also has the significant advantage of being readily implemented by replacement of the existing heating nozzle on the PMC machines. The nozzle of the invention can be fabricated in two pieces, to ease machining and manufacture of the nozzle.

BRIEF DESCRIPTION OF THE DRAWINGS

FIG. 6 shows a cross-section of the mandrel and the foam bottom wall blank installed thereon and the preferred nozzle of the invention, with the nozzle in heating position adjacent the foam bottom wall blank.

FIG. 7 shows a cross-section of the mandrel with both the bottom wall and sidewall blanks installed thereon after termination of the second heating stage and movement of the bottom wall blank to its sealing position.

FIG. 12 shows a perspective view of the assembly of the first and the second pieces into the preferred two-piece nozzle of the invention.

FIG. 13 shows a perspective and cross-sectional view of the assembled two-piece nozzle of the invention.

DESCRIPTION OF THE PREFERRED EMBODIMENT

The two-piece cup to which this invention relates is preferably fabricated from two pieces: a thermoplastic foam sidewall blank and a circular, thermoplastic foam bottom wall blank. If the cup is to be shaped substantially cylindrical, the sidewall blank used is rectangular in shape. To fabricate a preferred cup which tapers downward from its rim to its bottom, the sidewall blank is more or less keystone-shaped, having arcuate top and bottom edges and straight, upwardly divergent side edges. The circular blank that forms the bottom wall of the cup has at its circumference a continuous, downwardly projecting flange. In a cross-sectional view, the circular bottom wall blank thus appears U-shaped.

Figure 1:
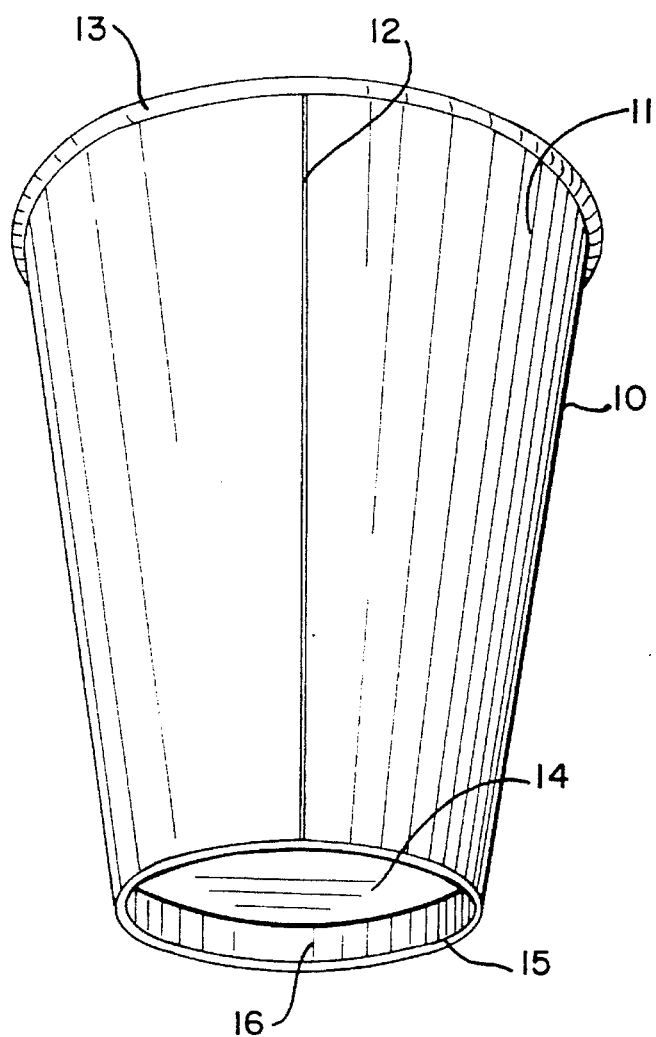
FIG. 1 shows a two-piece foam cup produced with the apparatus and method of the invention.

FIG. 1 shows a two-piece foam cup produced by the apparatus and method of the invention. Cup 10 comprises sidewall 11 which is formed from a sidewall blank and comprising sidewall seam 12 and a rolled rim 13. Cup 10 also comprises a recessed bottom wall 14, sealed around its periphery to the sidewall 11. The cup bottom wall 14 is recessed so that it intersects the cup's sidewall at a bottom position point above the cup sidewall bottom surface 15. The bottom portion 16 of sidewall 11 located below the recessed bottom wall is shown. In outer appearance, the preferred foam cups produced by the invention are identical to foam cups produced with the prior art radial flow heating nozzle.

In the manufacture of two-piece foam cups on a PMC machine using the prior art heating nozzle, defective cup reject rates of about 7 cups per 1000 cups were noted. This rate is unacceptably high. Investigations into the cause of the high reject rate discovered that the rejects were primarily due to improper sealing of the bottom wall blank to the sidewall blank.

Figure 2:
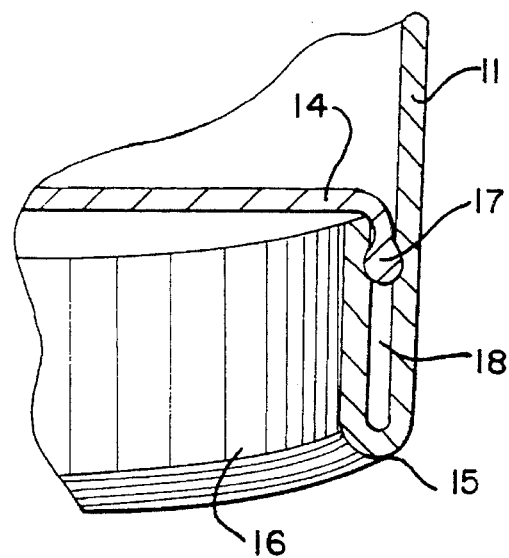
FIG. 2 shows a cross-section of a two-piece foam cup made with the prior art bottom heating nozzle apparatus.

FIG. 2 depicts an exploded and magnified cross-sectional view of the bottom portion of a two-piece foam cup produced with the prior art heating nozzle of U.S. Pat. No. 4,490,130. Shown in FIG. 2 are sidewall 11, bottom surface of cup sidewall 15, bottom portion 16 of the cup sidewall, and bottom wall 14. As seen in the cross-section, the bottom portion 16 actually is an extension of sidewall 11 which wraps around the flange portion 17 of bottom wall 14. Also shown in FIG. 2 is an annular space 18 due to improper sealing of the flange portion 17 of the cup bottom. Applicant discovered that after using the prior art heating nozzle in the first heating stage of foam cup production, as the cup bottom wall blank 14 was moved into its sealing position, the flange portion 17 of the cup bottom wall tended to stick to the sidewall 11 at a point or points around the periphery. If it did stick, the flange portion of the sidewall would ball up as depicted in FIG. 2, resulting in the annular space 18. Where this occurred, the flange portion had relatively much smaller area of contact with the sidewall. This can result in improper sealing.

Figure 3:
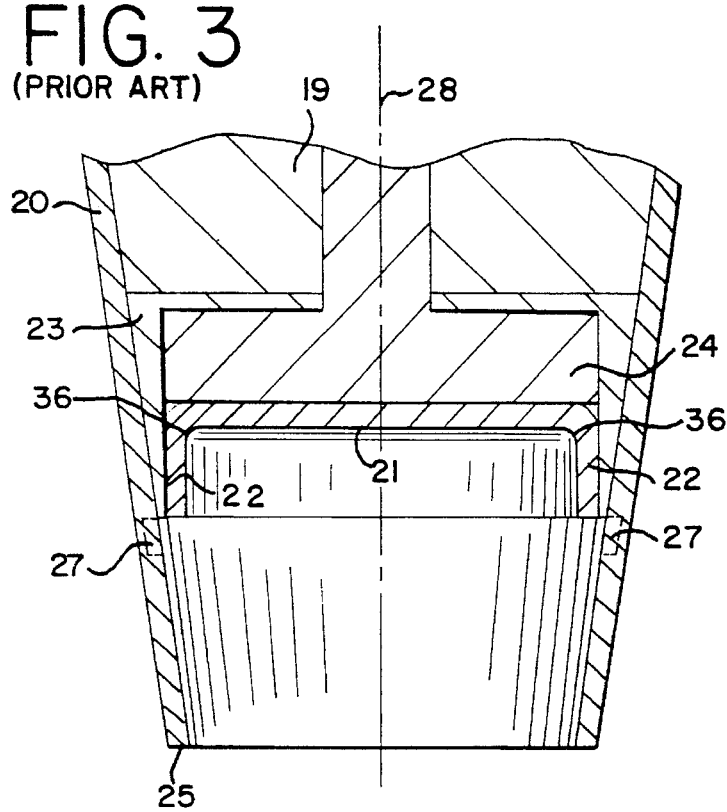
FIG. 3 shows a cross-section of a mandrel having a foam sidewall blank and a foam bottom wall blank positioned on the mandrel after heating with the prior art nozzle but before the bottom blank is moved to its sealing position.

FIG. 3 shows in cross-section mandrel 19 having central axis 28, with foam sidewall blank 20 having a lower end 25 and foam bottom wall blank 21 installed on the mandrel and mandrel nose 23, respectively, immediately after completion of both the first heating stage and the second heating stage with the prior art nozzle. The bottom blank 21 has a flange portion 22, with junction 36. Mandrel 19 also comprises a moveable piston 24 for moving the bottom blank after completion of the heating stages. In the second heating stage, the heating nozzle of the prior art, when inserted into its heating position adjacent the bottom blank, aimed the heating gas stream at area 27 on the sidewall blank.

Figure 4:
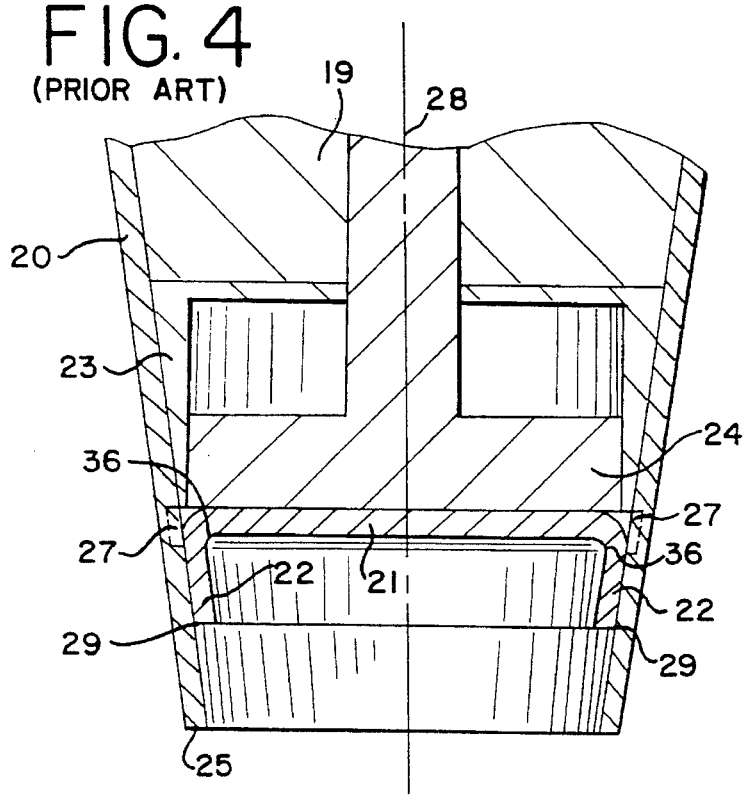
FIG. 4 shows a cross-section of a mandrel having the foam sidewall blank and the foam bottom wall positioned on the mandrel blank after the bottom blank is moved to its sealing position.

FIG. 4 shows in cross-section the location of bottom blank 21 after movement to its sealing position after the prior art heating stages are completed. Here, the piston 24 has extended parallel to central axis 28 away from mandrel nose 23 and has moved blank 21 past heated area 27 to its final sealing position 29 inside sidewall blank 20. Applicants determined that, if the bottom blank 21 was insufficiently heated in the first heating stage to enhance its shape retention, during movement of blank 21 past heated sidewall area 27, the flange portion 22 had a tendency to flare out and could stick to the heated area, resulting in the material build-up shown in FIG. 2. This sticking problem in two-piece foam cup production is ascerbated because of the different sealing requirement for making a two piece foam cup. The seal in the foam cup actually results from fusing the two thermoplastic foam surfaces together, which requires additional heat.

The apparatus and method of the invention are critical improvements in the prior art heating nozzle and method of U.S. Pat. No. 4,490,130. The apparatus and method of the invention are employed in the first heating stage of the bottom sealing operation to prevent the bottom wall sticking and improper sealing shown in FIG. 2 and described above. The method and apparatus of the invention also employ contactless heating with a heating gas stream, and overcome this problem by heating in the first heating stage the bottom wall blank primarily adjacent the juncture 36 between the flange portion of the bottom blank and the remainder of the bottom blank. In the invention, the heating gas is aimed at the flange juncture point to "set" the shape of the bottom wall blank, i.e. to substantially reduce or eliminate the tendency of the flange portion to flare out into contact with the sidewall blank.

Figure 5:
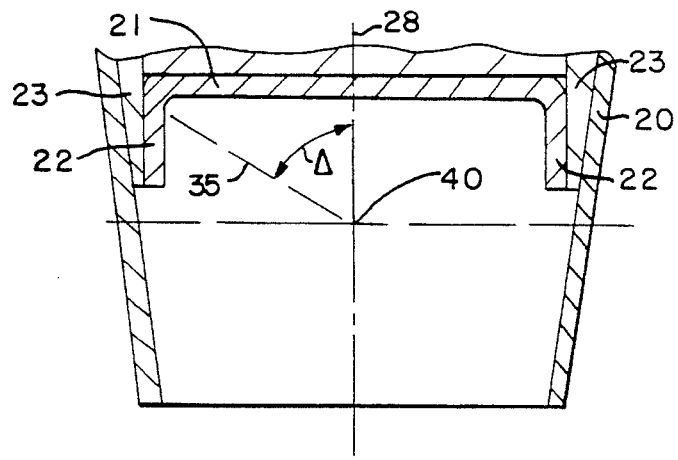
FIG. 5 shows a cross section of the mandrel and the foam bottom wall blank installed thereon, and the angle of incidence to the foam bottom wall blank of a heating gas stream, as used in the method of the invention and as directed by the nozzle of the invention.

FIG. 5 illustrates the method of the invention which comprises heating the bottom blank for a time and temperature effective to improve shape retention of the blank. Preferably, this heating is accomplished by primarily heating the part of blank 21 adjacent junction point 36 between blank 21 and its flange portion 22. This can be done by directing a heating gas stream at the junction point, so that the heating gas stream has an angle of incidence Δ to the bottom blank in the range of about 30 degrees to about 90 degrees, as measured from central axis 28 of the nozzle. In other words, the heating gas stream direction employed in the invention lies in between line 35 and central axis 28. FIG. 5 also shows the sidewall blank 20 installed on the mandrel. Blank 20 is shown for illustration only, because the invention relates to the first heating stage, which occurs before the sidewall blank is installed on the mandrel.

For illustration purposes, FIG. 5 shows the gas stream origin is at point 40 on the central axis 28. If the gas stream origin is closer to the sidewall 20, the angle of incidence is measured from a line which comprises the gas origin point and is drawn parallel to the center axis 28 of the nozzle. The precise angle of incidence also depends upon the distance from the gas exit to the sidewall blank. In the method of the invention, regardless of the precise location of the gas origin point, angles of incidence in the range of 30° to 90° are used to produce a heating gas stream aimed primarily at the junction point 36. Preferably, the angle of incidence is in the range of about 30 to 60 degrees to direct full flow of the gas stream at juncture 36. Gas flow angles of incidence less than 30 degrees are undesirable because they can ascerbate the sticking problem by excessive heating of the sidewall blank, like Konzal et al. Gas flow angles of incidence greater than about 60 degrees, although useful, are not preferred because they can result in too much turbulence, leading to uneven heating of the juncture point, and can complicate the heating gas exhaust. Applicant found that use of the invention produced sufficient heating of the bottom wall blank to set its shape to permit the bottom blank to be moved without sticking.

FIGS. 6 and 7 illustrate in cross-sectional view the method and nozzle of the invention, during the first heating stage (FIG. 6) and after completion of the first and second heating stages (FIG. 7). In each Figure, Mandrel 19 is shown with piston 24 and mandrel nose 23 and having bottom wall blank 21 with flange portion 22 installed on the mandrel nose. FIG. 7 shows the sidewall blank 20 installed on the mandrel outer surface. For comparison purposes, area 27, which is the primary area of the sidewall heated in the second heating stage is also shown on sidewall blank 20. In FIG. 6, two-piece nozzle 30 is shown attached to extension means 61, which extends the heating nozzle of the invention into heating position and then retracts it after heating. The extension means is preferably the same as disclosed by Konzal, et al., U.S. Pat. No. 4,449,130. Nozzle 30 preferably comprises two pieces: upper portion 33 and lower portion 31, and comprises gas flow channel 57 between the upper and lower portions. FIG. 6 shows the heating nozzle extended into heating position, with a gas flow direction 34 aimed at junction point 36, with an angle of incidence to the plane of blank 21 of about 45 degrees.

After the nozzle has been moved into heating position by activation of the extension means, the heating gas stream is generated and delivered to the nozzle by any suitable means, preferably as set out in U.S. Pat. No. 4,449,130. The heating gas preferably comprises air of low humidity. Any suitable heating gas composition and temperature can be used, and the temperature varies with the substrate used. The heating gas preferably has a temperature of about 300° F. (149° C.) to about 700° F. (372° C.), more preferably about 400° F. to about 600° F., for use with the preferred polystyrene bottom blank. The heating gas flow is maintained for a time effective to set the bottom blank to minimize flaring of the flange portion. This time is preferably about 0.08 to about 0.2 seconds at a gas flow rate of about 300 to about 1,000 standard cubic feet/hour. After the desired heating is accomplished, the extension means is activated to retract the heating nozzle to a position outside the sidewall blank. The mandrel with the heated, set bottom blank is then indexed to another work station, where the sidewall blank is installed and the side seam formed. Thereafter, the second heating stage is performed and immediately after its completion, the piston 24 is then extended to move the bottom blank to its final sealing position 29. The mandrel with the formed cup thereon can then be moved to other work stations for additional treatment, such as wrapping of the sidewall around the flange portion and the rim forming.

The overall sequence of cup forming steps is preferably controlled with a computer control system such as a programmable limit switch microprocessor. Any suitable control system can be used. The control system is set to produce appropriate dwell times for each work station, and for the first heating stage is set to produce the preferred heating gas flow time.

The nozzle of the invention can be of any suitable size, shape and material, but preferably is generally cylindrical with a diameter small enough to fit inside the diameter of the cup being formed. The precise size of the nozzle varies with cup size. The inventive nozzle comprises a central axis, a top face and at least one heating gas flow channel comprising a gas exit, wherein a gas flowing through the channel and out the exit has an angle of incidence to a plane oriented normal to the central axis of the nozzle in the range of about 30 to about 90 degrees. Preferably, the nozzle's top face is substantially circular to fit inside the flange of the bottom blank, and the gas exit is on the top face.

Preferably, sufficient heating gas is directed with the angle of incidence of the invention to heat the bottom wall/flange juncture at all parts of the juncture. This can be accomplished with multiple gas flow channels and exits aimed at different points of the juncture. Preferably, this is accomplished by employing a gas flow channel and exit which comprises a continuous, circular channel adjacent and configured to the outer circumference of the top face. This is preferred because the heating gas is directed at all parts of the juncture.

The nozzle preferably also tapers in size away from the top face to permit efficient heating gas exhaust past the nozzle during heating gas flow. The nozzle is suitably constructed from a metal or alloy with temperature and environmental stability under extended use in foam cup manufacturing conditions.

The gas flow channel and exit are configured to produce the desired gas flow angle of incidence with minimal turbulence. This means the gas flow channel has a land length ratio (the ratio, L/W, of channel length, L, to channel width or diameter, W, at the channel exit) of at least 2/1. Applicants prefer the nozzle has a gas flow channel with a land length ratio of about 10/1 for greater turbulence reduction.

Figure 8:
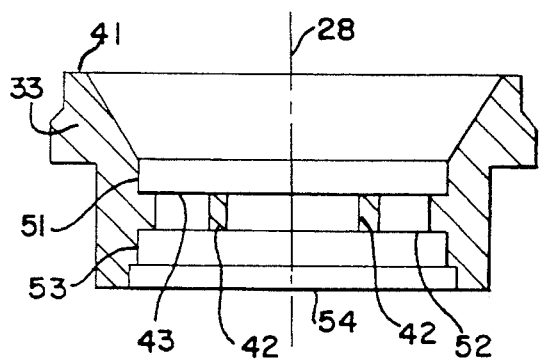
FIG. 8 shows a cross-sectional view of a first piece of a preferred two-piece nozzle of the invention.
Figure 9:
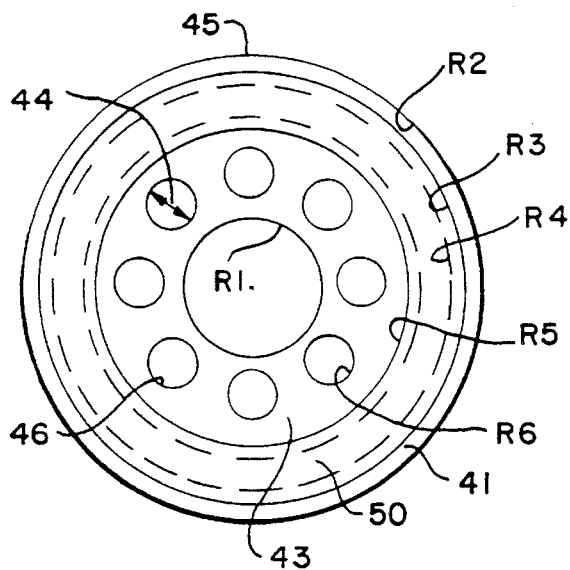
FIG. 9 shows a top view of the first piece of the preferred two-piece nozzle of the invention.

FIGS. 8–13 show a preferred two-piece heating nozzle of the invention. The nozzle is preferably constructed in two pieces for ease of fabrication and is assembled into one piece for installation onto the extension means 61. FIGS. 8 and 9 show unassembled lower portion 33 of the nozzle in cross-sectional and in top views, respectively. Lower portion 33 comprises a top surface 41, a gas channel surface 50, interior gas flow channels 42 which have exits 46 on gas flow surface 43, and nozzle fastening surface 52. The number of gas flow channels 42 can be any suitable number, with eight shown in FIG. 9, are preferably equally spaced around the circumference of surface 43, and are to be connected through any suitable means to the heating gas supply source. The diameter 44 of flow channel exit 46 is any suitable size to permit sufficient heating gas flow. Preferably diameter 44 is about 0.15 to about 0.30 inches. Ring 45 is larger in diameter than the top surface, to add mass for thermal stability.

The lower portion comprises a radius R2 sized to permit insertion of the nozzle inside the bottom wall blank, and its size thus varies with the size of the cup being made. For a twelve ounce tapered cup having a bottom diameter of 2.65 inches, R2 is 1.295 inches. For a preferred nozzle to produce a twelve ounce drinking cup, preferred radii are: R1 is about 0.35 to about 0.375 inches, R3 is about 1.110 to about 1.195 inches, R4 is about 1.10 to about 1.125 inches, R5 is about 0.85 to about 0.95 inches and R6 is about 0.1 to about 0.15 inches.

Figure 10:
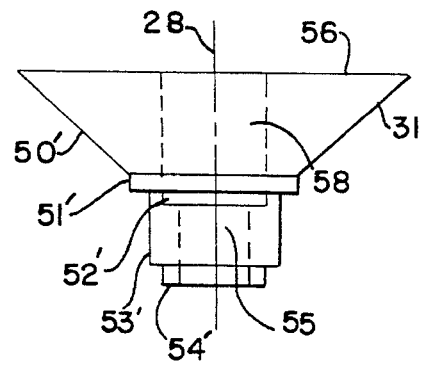
FIG. 10 shows a cross-section of a second piece of the preferred two-piece nozzle of the invention.
Figure 11:
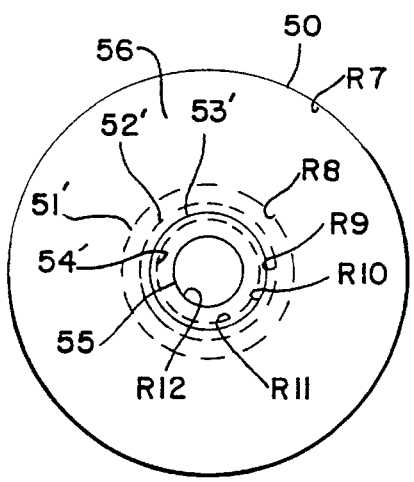
FIG. 11 shows a top view of the second piece of the preferred two-piece nozzle of the invention.

FIGS. 10 and 11 show the upper portion 31 of the preferred two piece nozzle. The upper portion is essentially solid having a bolt hold-down passage 58 running through it along its central axis 28. The upper portion 31 and lower portion 33 are sized and constructed to have the same central axis. They are fabricated into one piece, preferably, by way of a bolt, not shown, which is inserted through the upper portion and the lower portion, so that its bolt head rests on surface 52 and can be tightened onto the extension means 61 with a threaded nut or tapped installation. Radius R7 is sized, so that when the upper portion is installed inside the lower portion, a continuous, annular gas flow channel comprising an exit 57 (shown on FIGS. 12 and 13) having a width of about 0.025 to about 0.080 inches, is created. The gas flow channel is connected to the interior gas flow channels 42. To produce the preferred 12 ounce drinking cup, the preferred radii of the upper portion are: R7 is about 1.125 to about 1.145 inches, R8 is about 0.450 to about 0.475 inches, R9 is about 0.35 to about 0.375, R10 is about 0.30 inches, R11 is about 0.28 inches and R12 is about 0.20 inches.

Gas channel surface 50' after assembly is adjacent gas channel surface 50 of the lower portion. Surface 51' mates with surface 51 of the lower portion. Surface 52' rests on surface 52 of the lower portion. Bolt passage 58 narrows at part 55. Barrel 53' rests inside area 53 of the lower portion and bottom 54 rests on bottom 54 of the bottom portion.

FIG. 12 shows how the two pieces are assembled into the nozzle of the invention. FIG. 13 depicts the assembled nozzle in cross-section and in perspective. As shown, the upper portion is inserted into the lower portion 33 along common central axis 28, and the two pieces are attached to the extension means, preferably with a bolt which screws into the end of the extension means. When finally assembled, the upper surface 56 of the upper portion and the upper surface 41 of the lower portion are substantially co-planar and form the nozzle's top face which comprises the gas flow channel and exit 57. Also shown are the bolt hold-down surface 52, interior gas flow channels 42 and exits 46, gas flow surface 43, and gas channel surfaces 50 and 50' which form the channel 57. The length 58 of the gas flow channel is shown. The overall height of the nozzle can be any convenient height, but preferably is about 1.0 inches to about 2.0 inches.

One embodiment of the invention comprises a method for the sealing of a substantially circular bottom wall blank having a flange portion around its periphery to a surrounding, cylindrical sidewall blank, which preferably comprises (a) directing a heating gas stream having a temperature of about 300° F. (149° C.) to about 700° F. (372° C.) at a part of a junction between the flange portion of the bottom wall blank and the remainder of the bottom wall blank for a time of about 0.08 to about 0.2 second at a gas flow rate of about 300 to about 1000 standard cubic feet/hour; (b) moving the so-heated bottom wall blank to a sealing position inside the sidewall blank; (c) directing a stream of heating gas at the sidewall and bottom wall blanks; (d) wrapping a lower edge of the sidewall around the flange portion of the bottom wall blank around the periphery of the bottom wall blank; and (e) compressing the bottom wall blank and the sidewall blank to form a liquid proof seal between the bottom wall blank and the sidewall blank. In both the first and second heating steps of this embodiment, the heating gas stream is generated preferably with the apparatus of Konzal et al. Preferably, the second heating step is performed using the radial flow heating nozzle of Konzal et al. with preferred temperature, gas flow rate and heating time conditions of 300° F. (149° C.) to about 700° F. (372° C.) for a time of about 0.08 to about 0.2 second at a gas flow rate of about 300 to about 1000 standard cubic feet/hour. The wrapping and compression of the bottom wall and sidewall blanks are preferably performed at a separate work station using the apparatus described in Konzal et al.

The method and nozzle of the invention are preferably used in the manufacture of a two-piece polystyrene foam cup on the PMC machine described by Konzal et al., with the operation modified by the method of Peelman, et al., U.S. Pat. No. 4,579,275. The nozzle and method of the invention can be used with other substrates, i.e., in paper two-piece cup production, and in the second heating stage of foam cup production. The nozzle of Konzal et al. is preferred in the second heating stage of foam cup production, however.

Any suitable thermoplastic or other substrate can be used as the roll stock from which the blanks are formed, including preferably the rollstock is a laminate comprising a layer of a polystyrene foam formed from a polystyrene resin and a volatile blowing agent and, on one surface of the foam, a layer of a solid polystyrene. The preferred polystyrene laminate comprises a solid polystyrene layer of about 0.002 to about 0.010 inch thickness, more preferably about 0.003 inch thickness, and a foam polystyrene layer of about 0.03 to about 0.60 inch thickness, more preferably about 0.042 inch thickness.

The preferred roll stock from which the blanks are made can be produced by the foam sheet production line in Masur, U.S. Pat. No. 3,699,794 or the double coated line of Whelan et al., U.S. Pat. No. 3,616,020, both patents incorporated herein by reference. The double coated line has capability for direct extrusion coating of the foam sheet on either surface with any desired thickness of a polystyrene, such as an impact modified polystyrene, however the line must include the means to regulate cooling of the outer surface of the foam sheet at the point of foam extrusion by air having a controlled temperature and flow rate. The blowing agent system is preferably capable of adding simultaneously a combination of at least two separate blowing agents in any desired ratio, the addition rate of each being independent of the other, and the total rate in combination selectable by the operator. The winding of the produced laminate sheet must be done in the web width desired for use on the cup machine to properly control diffusion of air into the sheet and blowing agent equalization from the roll stock.

Among the blowing agents that can be used to obtain the preferred sheets used with the instant invention are hydrocarbons such as ethane, propane, n-butane, n-pentane, isopentane, and hexane, $CO_2$, water, $N_2$, and other inert gases. Suitable mixtures of these blowing agents can also be used. Preferably, the blowing agent is a mixture of n-butane and n-pentane, as set out in Schubert, U.S. Pat. No. 4,878,970.

The blowing agent selected should provide the desired sheet thickness, appearance, and forming characteristics for producing the rolled lip of the cup, such that the sheet thickness supplied to the cup producing machine can be rolled into a rim or lip having a diameter of 0.100–0.180 inches and the sidewall thickness after heating to reinflated configuration is at a desirable thickness of about 0.030 to about 0.050. It is also desirable to select a blowing agent which provides a greater degree of control of the foam skin in density and appearance, especially after printing. This greater control of the foam skin improves appearance and strength as well as imparting a pleasant feel to the cup lip and the desired sidewall deflection strength of 300 grams or greater can be achieved.

The preferred polystyrene foam density can be varied from about 2 to about 10 pounds per cubic foot, with foam cell size from about 0.0015 inch to about 0.005 inch. The foam cells are typically obround with the longest axis in the machine or extrusion direction. The cell size control is typically augmented by the addition of talc in the range of about 0.05 to about 3 percent by weight of the polystyrene resin to the polystyrene feedstock. The base polystyrene resin can have a melt flow rate of about 0.8 to about 7.5, and can include styrene butadiene or other impact modifier to improve sheet flexibility.

Reclaim of the laminate material can be used in the foam layer and the coating layer. Up to 60 weight percent of the foam layer can be reclaim and up to 30 weight percent of the coating layer can be reclaim.

If a colorant is desired in either the foam or coating layers, the colorant can be added in the resin blending stations. Typically, cups have been produced from white foam material coated with white colored polystyrene. Color print can be added to the coating layer via any suitable off-line printing process. The cups are preferably formed so that the foam layer is the cup interior.

EXAMPLE

A two-piece nozzle of the invention was fabricated from stainless steel by machining an upper portion 31 and a lower portion 33 as pictured in FIGS. 8–13. Both pieces were machined with radii and dimensions as set out above for preferred use in manufacture of a 12 ounce cup. The overall height of the assembled nozzle was 1.12 inches. The gas flow channel 57 has an interior width (between surfaces 50 and 50') of 0.050 inches, an interior length of 0.536, and had a continuous, circumferential opening located on the top face of the nozzle 0.10 inch from the outer edge of the nozzle. The land length ratio of the gas flow channel was 10.7. The two pieces were assembled as shown in FIG. 12 and installed onto a 1000 F cup machine from Paper Machinery Corporation, by replacing the prior art, radial airflow heating nozzle of that machine located at the work station which performs the first heating stage of the bottom sealing process. The machine was then used to form two-piece foam cups from a two layer laminate comprising a 0.003 inch solid polystyrene layer and a 0.042 inch foam polystyrene layer. The produced cups had a 4.5 grams/100 sq. inch sidewall and a 2.3 grams/100 sq. inch bottom wall. No changes to the cup forming process, other than the use of the nozzle and method of the invention in the first heating stage were made. The nozzle tested had a gas flow channel with an angle of incidence of about 45 degrees. The heating gas temperature, flow rate and period of gas flow used in the first heating stage were 585° F. (307° C.), 800 SCF/hr. and 0.1 seconds, respectively. No significant problems were met during trials of the nozzle and method of the invention. Cups produced using the invention were found to have leak-proof bottom seals.

We claim:

1. An apparatus for heating the bottom wall during the manufacture of a two-piece cup having a circumferential sidewall and a recessed bottom wall having a juncture formed from a bottom wall blank and a flange portion of the bottom wall blank wherein the apparatus comprises:

a heating nozzle having a central axis and comprising (i) a top face and (ii) at least one heating gas flow channel having a gas exit for directing a heating gas stream primarily adjacent the juncture of said recessed bottom wall.

2. The apparatus of claim 1 fabricated from two pieces wherein a first piece comprises the top face and a gas flow channel upper surface and a second piece comprises a gas flow channel lower surface.

3. The apparatus of claim 2 comprising at least one gas flow channel defined by the interior surface of said second piece.

4. The apparatus of claim 1 wherein the top face is substantially circular and comprises a continuous, circular gas exit.

5. The apparatus of claim 4 wherein the continuous, circular gas exit is located on the top face of the nozzle within 0.2 inches of an outer periphery of the top face.

6. The apparatus of claim 4 wherein the continuous, circular gas exit comprises a width of about 0.025 to about 0.080 inch.

7. The apparatus of claim 3 comprising a land length ratio of at least ⅔.

8. The apparatus of claim 3 comprising a land length ratio of about 10/1.

9. The apparatus of claim 1 comprising more than one gas exit.

\* \* \* \* \*